United States Patent
Kinjo et al.

(10) Patent No.: US 10,511,200 B2
(45) Date of Patent: Dec. 17, 2019

(54) STATOR AND ELECTRIC MOTOR WITH CANCEL COIL FOR REDUCING UNBALANCED MAGNETIC FLUX

(71) Applicant: TOYOTA JIDOSHA KABUSHIKI KAISHA, Toyota-shi, Aichi-ken (JP)

(72) Inventors: Hirofumi Kinjo, Nagoya (JP); Masahito Shirahase, Nishio (JP); Toru Wakimoto, Chiryu (JP); Takeshi Tomonaga, Toyota (JP); Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 220 days.

(21) Appl. No.: 15/403,815

(22) Filed: Jan. 11, 2017

(65) Prior Publication Data

US 2017/0207673 A1    Jul. 20, 2017

(30) Foreign Application Priority Data

Jan. 15, 2016 (JP) .................. 2016-005999

(51) Int. Cl.
| | | |
|---|---|---|
| *H02K 3/20* | (2006.01) | |
| *H02K 3/16* | (2006.01) | |
| *H02K 1/14* | (2006.01) | |
| *H02K 3/18* | (2006.01) | |
| *H02K 3/28* | (2006.01) | |
| *H02K 7/08* | (2006.01) | |
| *H02K 21/14* | (2006.01) | |

(Continued)

(52) U.S. Cl.
CPC ............... *H02K 3/20* (2013.01); *H02K 1/146* (2013.01); *H02K 3/16* (2013.01); *H02K 3/18* (2013.01); *H02K 3/28* (2013.01); *H02K 7/083* (2013.01); *H02K 5/1732* (2013.01); *H02K 11/40* (2016.01); *H02K 21/14* (2013.01)

(58) Field of Classification Search
CPC .. H02K 3/12; H02K 3/16; H02K 3/42; H02K 11/01; H02K 23/22; H02K 3/20; H02K 3/28
USPC .............. 310/68 R, 179, 197, 204, 210, 183
See application file for complete search history.

(56) References Cited

U.S. PATENT DOCUMENTS

| | | | | |
|---|---|---|---|---|
| 2,484,261 | A * | 10/1949 | Whitney ................. | H02K 3/16 310/68 R |
| 2009/0230806 | A1 * | 9/2009 | Miyata ..................... | H02K 3/28 310/195 |

FOREIGN PATENT DOCUMENTS

| | | |
|---|---|---|
| DE | 1613065 A1 | 12/1970 |
| JP | 2008301551 A | 12/2008 |

(Continued)

*Primary Examiner* — Michael Andrews
*Assistant Examiner* — Minki Chang
(74) *Attorney, Agent, or Firm* — Sughrue Mion, PLLC

(57) ABSTRACT

A stator for a electric motor, the stator including: a stator core including a yoke having an annular shape, and a plurality of teeth protruding from an inner circumferential surface of the yoke in a stator radial direction; a stator coil wound around the teeth, the stator coil being configured to generate a rotating magnetic field as a current is applied thereto; and a cancel coil extending in a stator axial direction at positions on the inner circumferential side and the outer circumferential side relative to the yoke, the cancel coil being wound around the stator core so as to extend in the stator radial direction and traverse the yoke at positions outside the stator core in the stator axial direction, and constituting one or more closed circuits.

11 Claims, 12 Drawing Sheets

(51) Int. Cl.
　　　*H02K 5/173*　　　(2006.01)
　　　*H02K 11/40*　　　(2016.01)

(56) References Cited

FOREIGN PATENT DOCUMENTS

| | | |
|---|---|---|
| JP | 2014-011827 A | 1/2014 |
| WO | 2005/034314 A1 | 4/2005 |

* cited by examiner

STATOR AND ELECTRIC MOTOR WITH CANCEL COIL FOR REDUCING UNBALANCED MAGNETIC FLUX

INCORPORATION BY REFERENCE

The disclosure of Japanese Patent Application No. 2016-005999 filed on Jan. 15, 2016 including the specification, drawings and abstract is incorporated herein by reference in its entirety.

BACKGROUND

1. Technical Field

The present embodiment relates to a stator including a stator core and a stator coil that generates a rotating magnetic field, and to an electric motor having this stator.

2. Description of Related Art

Conventionally, three-phase electric motors have been widely known. Such a three-phase electric motor has a stator and a rotor, with a rotating shaft installed at the center of the rotor. The rotating shaft is rotatably mounted on a housing through bearings, and rotates with the rotor as a current is applied to a stator coil. The stator has a stator core and the stator coil wound around the stator core, and the stator coil has three-phase coils, namely, a U-phase coil, a V-phase coil, and a W-phase coil. When a three-phase alternating current is applied to these three-phase coils, a rotating magnetic field is generated, causing the rotor to rotate.

The conventional electric motors are afflicted with a problem that electrical corrosion occurs on the bearings supporting the rotating shaft. This will be described with reference to FIG. 16. FIG. 16 is a view showing the configuration of a conventional electric motor 10. Any magnetic unbalance occurring inside the electric motor 10 results in a magnetic flux of higher electrical frequency (hereinafter referred to as an unbalanced magnetic flux 50) being generated around a rotating shaft 16. Then, a voltage (hereinafter referred to as a shaft voltage) is induced across both ends of the rotating shaft 16 due to the unbalanced magnetic flux 50. FIG. 17 is a graph showing one example of waveforms representing a shaft voltage VS and a current flowing through a U-phase coil (U-phase current AU). As shown in FIG. 17, the shaft voltage VS is a tertiary harmonic voltage having a frequency three times higher than the fundamental frequency. The shaft voltage VS is applied through the rotating shaft 16 and a housing 18 to the inner and outer rings of rotating bearings 19. Although the inner and outer rings of the bearing 19 are insulated from each other with a lubricating oil film, this lubricating oil film is as thin as several μm, and thus insulation breakdown occurs when a voltage above a certain threshold (about several volts) is applied. Once the insulation between the inner and outer rings of the bearing 19 has broken down, an induced current 52 flows through a circulation route from the rotating shaft 16 to the bearing 19 to the housing 18 and back to the rotating shaft 16 as indicated by the broken line in FIG. 16. A problem arises here that the joule loss concentrates at the part of insulation breakdown, i.e., the bearing 19, which promotes electrical corrosion of the bearing 19.

To suppress such electrical corrosion of the bearings, the technique disclosed in Japanese Patent Application Publication No. 2014-11827 involves separately providing a conductive member that mechanically couples together a rotating shaft and a housing. This configuration can suppress electrical corrosion of the bearings by causing an induced current to flow dominantly to the conductive member that has lower impedance than the bearings.

SUMMARY

However, the technique of Japanese Patent Application Publication No. 2014-11827, which requires separately providing a conductive member, imposes structural restrictions on the rotating shaft, the housing, and the rotation output part. Thus, other problems arise such as that the design flexibility decreases and that the electric motor as a whole increases in size, weight, and cost.

In view of the above problems, the present embodiment provides an electric motor and a stator that can suppress electrical corrosion of the bearings without requiring a conductive member that couples together the rotating shaft and the housing.

A stator for an electric motor in an embodiment of the present embodiment includes: a stator core including a yoke having an annular shape, and a plurality of teeth protruding from an inner circumferential surface of the yoke in a stator radial direction; a stator coil wound around the teeth, the stator coil being configured to generate a rotating magnetic field as a current is applied to the stator coil; and a cancel coil extending in a stator axial direction at positions on the inner circumferential side and the outer circumferential side relative to the yoke, the cancel coil being wound around the stator core such that the cancel coil extends in the stator radial direction at positions outside the stator core in the stator axial direction and traverses the yoke, and the cancel coil including at least one closed circuit.

This configuration causes an unbalanced magnetic flux flowing inside the yoke in the circumferential direction to penetrate the cancel coil, so that a tertiary voltage is induced in the cancel coil. Then, as the tertiary voltage is induced, a current in the direction of blocking the unbalanced magnetic flux flows through the cancel coil. As a result, the unbalanced magnetic flux is reduced and electrical corrosion of the bearings is suppressed.

The above aspect may be configured as follows. The stator coil has a U-phase coil (PU), a V-phase coil (PV), and a W-phase coil (PW); the U-phase coil, the V-phase coil, and the W-phase coil are connected to one another; the cancel coil has at least one first element coil (CU) corresponding to the U-phase coil, at least one second element coil (CV) corresponding to the V-phase coil, and at least one third element coil (CW) corresponding to the W-phase coil; and the cancel coil includes at least one closed circuit in which the first element coil, the second element coil, and the third element coil are connected in series.

An effective magnetic flux that generates rotating torque also penetrates the cancel coil. Thus, three-phase primary induced voltages different from one another in phase are induced in the first to third element coils. When these first to third element coils are connected in series, the primary induced voltages cancel one another, reducing the primary voltage value in the closed circuit as a whole. As a result, a current in the direction of blocking the effective magnetic flux is less likely to flow through the cancel coil, so that a decrease in rotating torque can be suppressed.

A magnetomotive force of first element coil, a magnetomotive force of the second element coil, and a magnetomotive force of the third element coil may be equal to one another.

This configuration can reduce the primary voltage in the closed circuit as a whole to nearly zero. As a result, almost no current in the direction of blocking the effective magnetic flux flows through the cancel coil, so that a decrease in rotating torque can be prevented.

The above aspect may be configured as follows. The cancel coil has a plurality of first element coils wound at different locations, a plurality of second element coils wound at different locations, and a plurality of third element coils wound at different locations, and all the pluralities of the first element coils, the second element coils, and the third element coils are connected in series to constitute a single closed circuit.

Even when an effective magnetic flux generated is magnetically unbalanced due to eccentricity of the rotor etc., this configuration can reduce that influence on the closed circuit as a whole.

The above aspect may be configured as follows. The cancel coil has a plurality of first element coils wound at different locations, a plurality of second element coils wound at different locations, and a plurality of third element coils wound at different locations, and the cancel coil has a plurality of closed circuits in each of which one first element coil, one second element coil, and one third element coil are connected in series.

This configuration can simplify the configuration of each closed circuit, allowing easy winding of the cancel coil.

The above aspect may be configured as follows. Grooves penetrating in the stator axial direction are provided at locations facing to the teeth in an outer circumferential surface of the yoke, and the cancel coil is partially housed in the grooves.

This configuration can prevent the cancel coil from protruding from the outer circumferential surface of the stator core, and thus can prevent interference between the stator and the housing.

The above aspect may be configured as follows. The cancel coil is configured to pass through a slot that is a gap between the teeth, and the cancel coil is configured to be wound such that the cancel coil traverses the yoke at positions outside the stator core in the stator axial direction.

This configuration can shorten the wire length of the cancel coil as well as improve the magnetic properties compared with a configuration in which the cancel coil traverses the stator coil and the teeth.

The above aspect may be configured as follows. The cancel coil is configured to pass through positions on the inner circumferential side relative to the stator coil, and the cancel coil is configured to be wound such that the cancel coil traverses the stator coil and the yoke at positions outside the stator core in the stator axial direction.

This configuration can suppress an unbalanced magnetic flux even when the slot has no extra space.

The above aspect may be configured as follows. The cancel coil is configured to pass through positions on the inner circumferential side relative to the teeth, and the cancel coil is configured to be wound such that the cancel coil traverses the teeth and the yoke at positions outside the stator core in the stator axial direction.

This configuration can suppress an unbalanced magnetic flux even when the slot has no extra space.

The above aspect may be configured as follows. The stator coil is configured of the U-phase coil, the V-phase coil, and the W-phase coil in star connection, and the cancel coil is not connected to the stator coil.

This configuration can suppress an unbalanced magnetic flux in a stator having the coils in star connection.

The above aspect may be configured as follows. The stator coil is composed of the U-phase coil, the V-phase coil, and the W-phase coil in delta connection, and the cancel coil is connected in series to the stator coil.

This configuration can suppress an unbalanced magnetic flux in a stator having the coils in delta connection.

An electric motor in another embodiment of the present embodiment includes: a rotor; a rotating shaft configured to be rotatably mounted on a housing through bearings and rotate with the rotor; and a stator disposed on the outer periphery of the rotor, the stator including: a stator core including a yoke having an annular shape, and a plurality of teeth protruding from an inner circumferential surface of the yoke in a stator radial direction; a stator coil wound around the teeth, the stator coil being configured to generate a rotating magnetic field as a current is applied to the stator coil; and a cancel coil extending in a stator axial direction at positions on the inner circumferential side and the outer circumferential side relative to the yoke, the cancel coil being wound around the stator core such that the cancel coil extends in the stator radial direction at positions outside the stator core in the stator axial direction and traverses the yoke, and the cancel coil including at least one closed circuit.

This configuration causes an unbalanced magnetic flux flowing inside the yoke in the circumferential direction to penetrate the cancel coil, so that a tertiary voltage is induced in the cancel coil. Then, as the tertiary voltage is induced, a current in the direction of blocking the unbalanced magnetic flux flows through the cancel coil. As a result, the unbalanced magnetic flux is reduced and electrical corrosion of the bearings is suppressed.

According to the present embodiment, providing the cancel coil can reduce the unbalanced magnetic flux. As a result, it is possible to suppress electrical corrosion of the bearings without providing a conductive member that couples together the rotating shaft and the housing.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
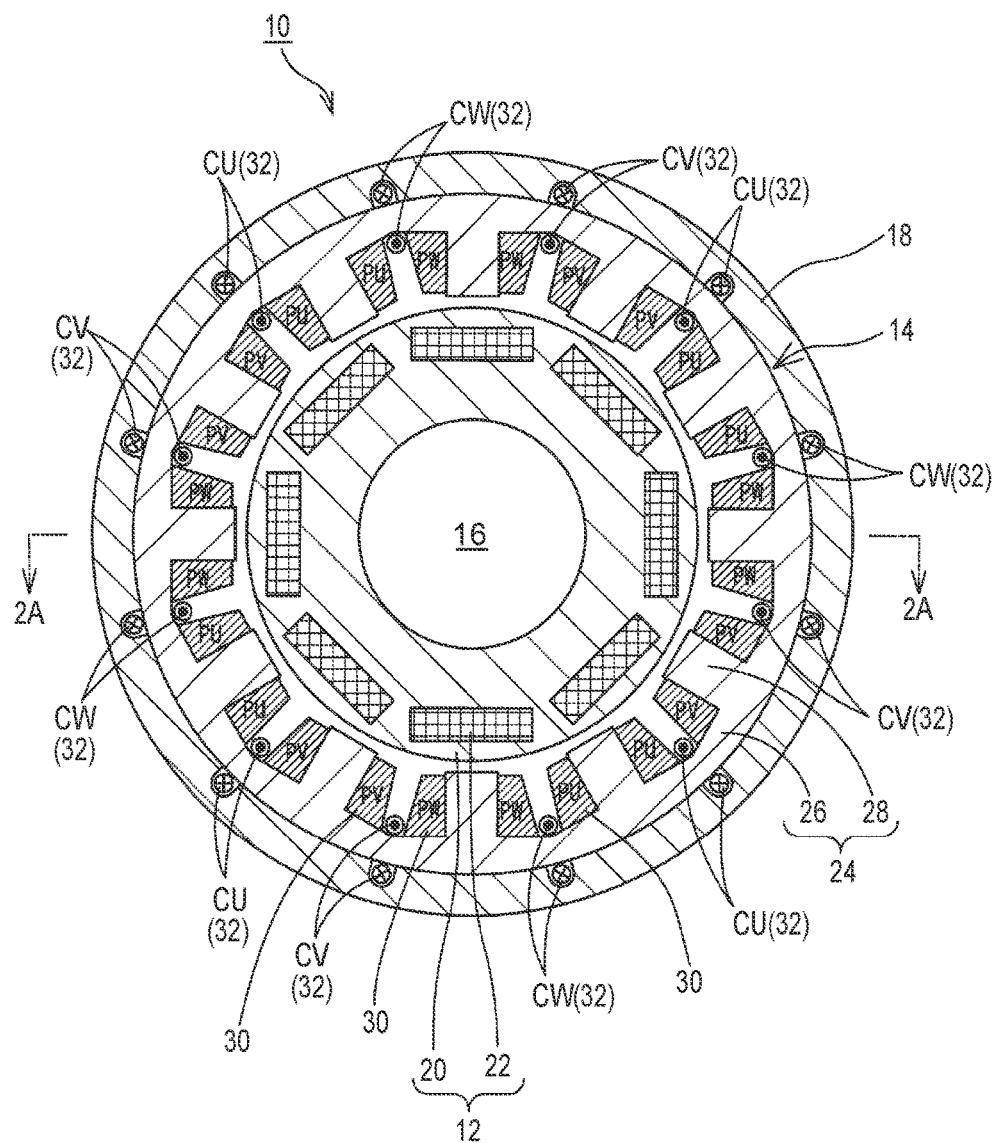
FIG. 1 is a transverse sectional view of an electric motor that is an embodiment of the present embodiment.
Figure 2:
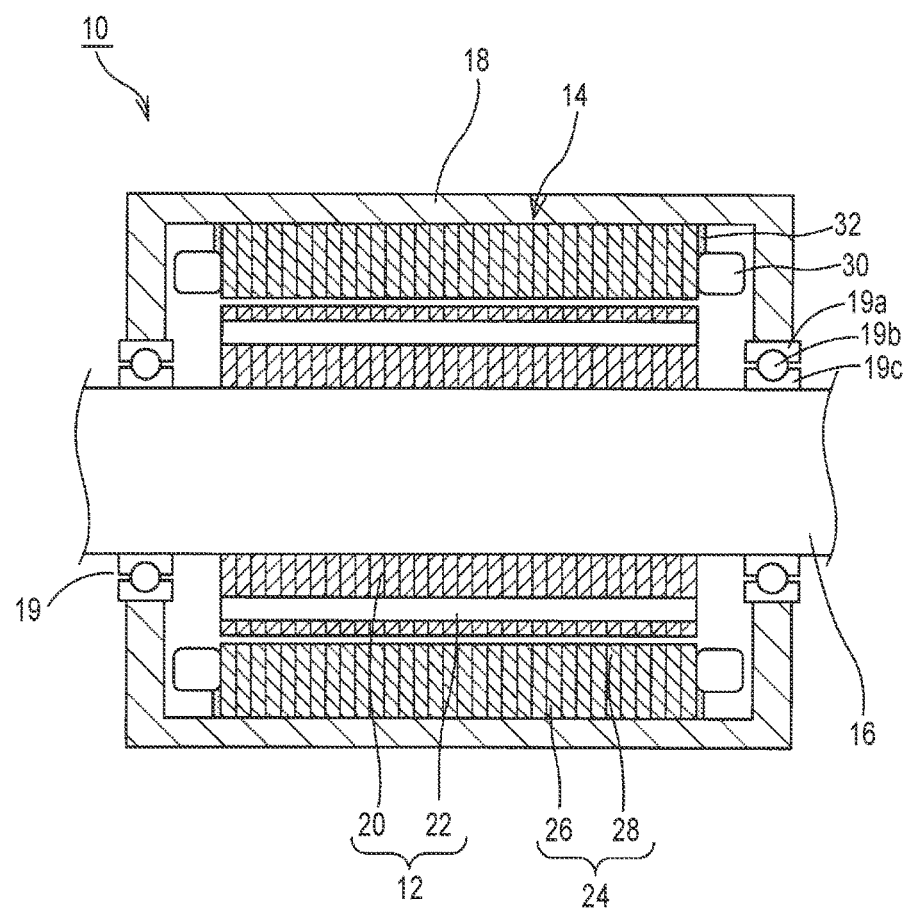
FIG. 2 is a sectional view taken along the line 2A-2A of FIG. 1.

An embodiment will be described below with reference to the drawings. FIG. 1 is a transverse sectional view of an electric motor 10 that is an embodiment. FIG. 2 is a sectional view taken along the line 2A-2A of FIG. 1. For visibility, a cancel coil 32 is shown in a comparatively large size in the drawings to be referred to, but the actual size of the cancel coil 32 is smaller. In the following description, an axial direction, a circumferential direction, and a radial direction refer respectively to an axial direction, a circumferential direction, and a radial direction of a stator 14.

The electric motor 10 is mainly divided into a rotor 12, the stator 14, a rotating shaft 16, and a housing 18. The rotor 12 includes a rotor core 20 and permanent magnets embedded in the rotor core 20. The rotor core 20 is a columnar member composed of a stack of electromagnetic steel sheets. The rotating shaft 16 is inserted and fixed at the center of the rotor core 20. The rotating shaft 16 is mounted at both ends on the housing 18 through bearings 19, and the rotating shaft 16 and the rotor core 20 fixed to the rotating shaft 16 are rotatable relative to the housing 18.

The bearing 19 has a plurality of rolling elements 19b (spherical bodies) disposed between an outer ring 19a and an inner ring 19c, with a lubricating oil film interposed between the outer ring 19a and the rolling elements 19b and between the inner ring 19c and the rolling elements 19b. This lubricating oil film functions both as a lubricant that allows smooth motion of the rolling elements 19b and as an insulation member that insulates the outer ring 19a and the inner ring 19c from each other. With the lubricating oil film thus interposed, the rotating shaft 16 and the housing 18 are electrically insulated from each other.

The stator 14 has a stator core 24, a stator coil 30, and the cancel coil 32. The stator core 24 is a roughly cylindrical member that is disposed concentrically with the rotor 12, and includes an annular yoke 26 and a plurality of teeth 28 protruding in the radial direction from an inner circumferential surface of the yoke 26. The plurality of teeth 28 are arranged at predetermined intervals in the circumferential direction, and a slot that is a space into which the stator coil 30 is inserted is formed between each two adjacent teeth 28.

Such a stator core 24 is composed of a plurality of electromagnetic steel sheets (e.g., silicon steel sheets) stacked in the axial direction. The plurality of electromagnetic steel sheets are positioned relative to one another and joined together to constitute the stator core 24. Many methods for positioning and joining electromagnetic steel sheets have been hitherto proposed. One example is a method in which a protrusion and a recess for crimping are formed in each electromagnetic steel sheet, and the protrusion of one electromagnetic steel sheet is fitted into the recess of another electromagnetic steel sheet to thereby position relative to one another and couple together the plurality of electromagnetic steel sheets and constitute the stator core 24.

Figure 18:
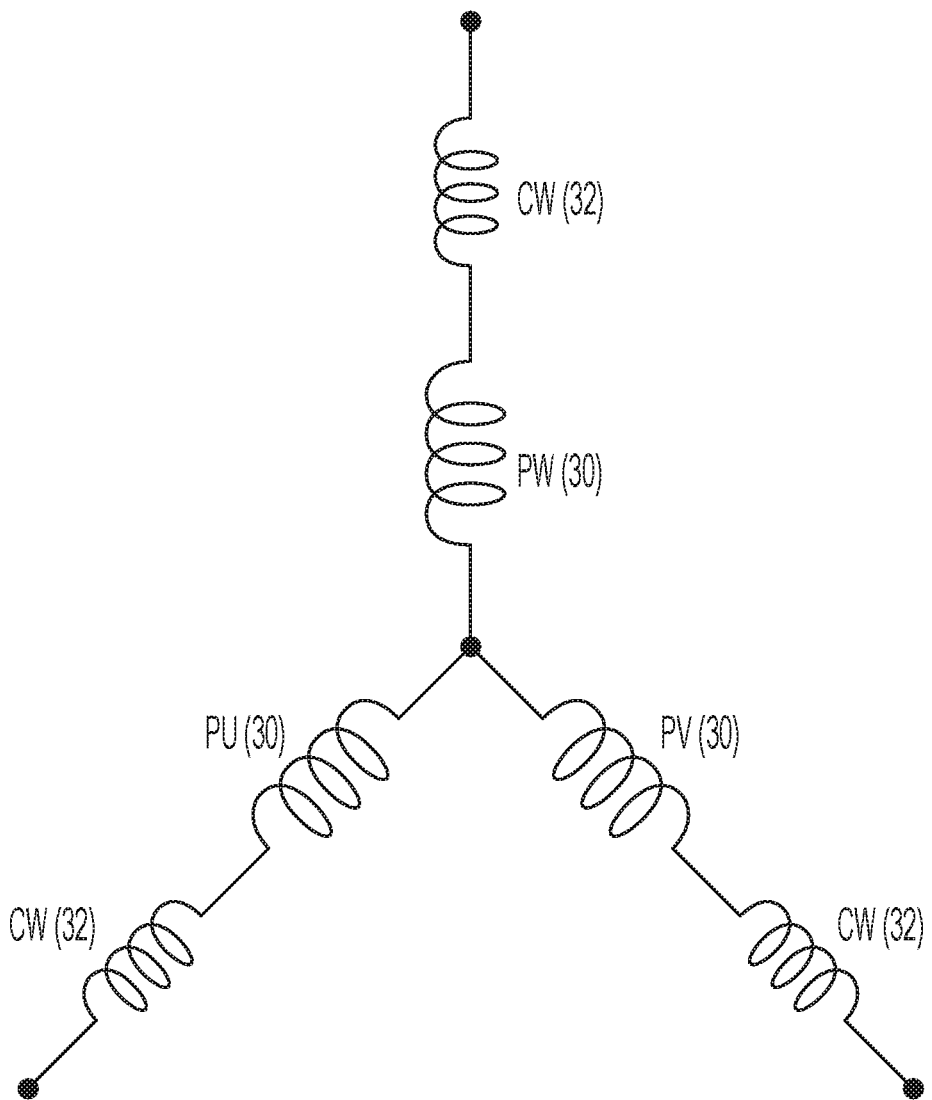
FIG. 18 is a connection diagram of a stator coil and a cancel coil in a star connection.

The stator coil 30 is composed of windings wound around the teeth 28 in concentrated arrangement. The stator coil 30 has three-phase phase coils, namely, a U-phase coil PU, a V-phase coil PV, and a W-phase coil PW. Where no distinction is made among the U-phase, the V-phase, and the W-phase in the following description, the phase coils will be referred to simply as phase coils P by omitting the alphabets U, V, W. One end of each phase coil P is connected to an input terminal (not shown). The other end of each phase coil P is connected to another phase coil P to constitute a neutral point (as shown in FIG. 18). Thus, the three-phase phase coils PU, PV, PW are in a state of so-called star connection. Each phase coil P is composed of a plurality of single coils connected in series, and each single coil is composed of a winding wound around one tooth 28. The single coil of the U-phase, the single coil of the V-phase, and the single coil of the W-phase are set on the plurality of teeth 28 so that this sequence is repeated in the circumferential direction. However, this configuration of the stator coil 30 is merely an example and may be changed as appropriate. For example, the arrangement of the stator coil 30 is not limited to concentrated winding but may instead be distributed winding. In either case, when a three-phase alternating current is applied to the stator coil 30, a rotating magnetic field is formed, causing the rotor 12 to rotate.

The cancel coil 32 is a coil wound around the yoke 26. The cancel coil 32 is not connected to the stator coil 30 but provided completely independent of the stator coil 30. The cancel coil 32 includes four first element coils CU corresponding to the U-phase coil PU, four second element coils CV corresponding to the V-phase coil PV, and four third element coils CW corresponding to the W-phase coil PW. Where no distinction is made among the first to third element coils, the element coils will be referred to simply as element coils C by omitting the alphabets U, V, W. Each element coil C extends in the axial direction at positions on the inner circumferential side and the outer circumferential side relative to the yoke 26, and is wound around the yoke 26 so as to extend in the radial direction and traverse the yoke 26 at positions outside the stator core 24 in the axial direction. As will be described in detail later, two types of magnetic fluxes flow through the yoke 26 in the circumferential direction, and the element coils C are wound so as to surround the periphery of the magnetic fluxes flowing in the circumferential direction.

Here, the expression "corresponding to the U-phase coil PU" means "having a certain magnetic relation with the U-phase coil PU." For example, in this embodiment, the element coil disposed next to the U-phase coil PU on the left side (between the U-phase coil PU and the V-phase coil PV) is the first element coil CU corresponding to the U-phase coil PU. Although the four first element coils CU are wound at different locations as is clear from FIG. 1, the first element coils CU are each disposed next to the U-phase coil PU on the left side and thus subjected almost equally to the magnetic influence of the stator coil 30.

Similarly, the coil disposed next to the V-phase coil PV on the left side (between the V-phase coil PV and the W-phase coil PW) is the second element coil CV corresponding to the V-phase coil PV, and the coil disposed next to the W-phase coil PW on the left side (between the W-phase coil PW and the U-phase coil PU) is the third element coil CW corresponding to the W-phase coil PW. Each of the first to third element coils CU, CV, CW has a certain positional relation with the corresponding phase coil P, and is subjected to a certain magnetic influence of a magnetic flux (so-called effective magnetic flux) generated as a current is applied to the corresponding phase coil P.

Figure 3:
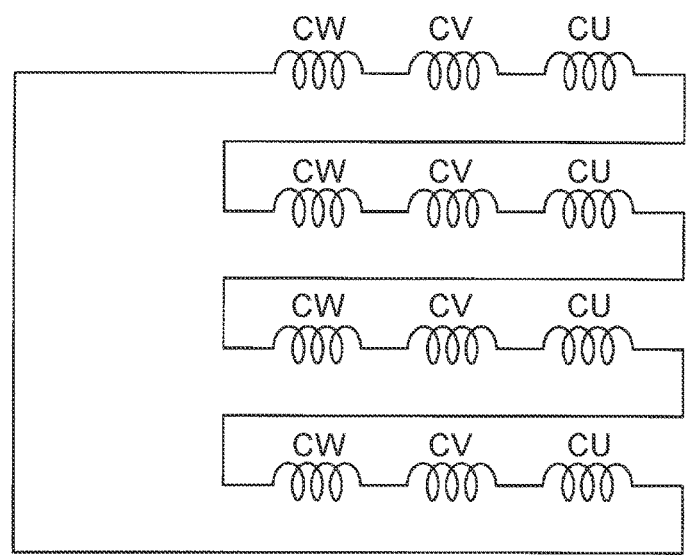
FIG. 3 is a connection diagram of a cancel coil.

Such first to third element coils CU, CV, CW are connected to one another so as to constitute one or more closed circuits. While various forms of connection are conceivable, in this embodiment, the four first element coils CU, the four second element coils CV, and the four third element coils CW composing the cancel coil 32 are connected in series to constitute a single closed circuit as shown in FIG. 3.

Figure 16:
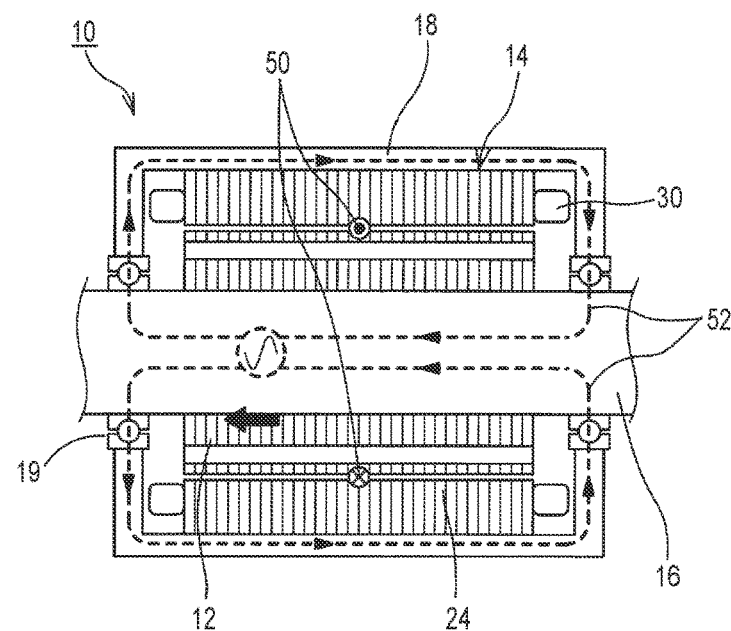
FIG. 16 is a longitudinal sectional view of a conventional electric motor.
Figure 17:
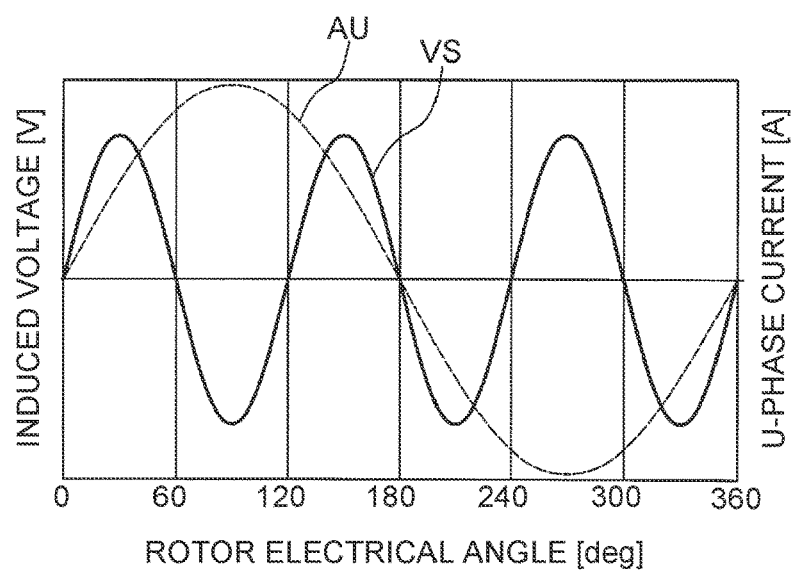
FIG. 17 is a graph showing a U-phase current and a shaft voltage in the conventional electric motor.

Next, reasons why the cancel coil 32 is provided will be described. FIG. 16 is a view showing the configuration of a conventional electric motor 10. Any magnetic unbalance occurring inside the electric motor 10 results in a magnetic flux of higher electrical frequency (hereinafter referred to as an unbalanced magnetic flux 50) being generated around the rotating shaft 16. Then, a voltage (hereinafter referred to as a shaft voltage) is induced across both ends of the rotating shaft 16 due to the unbalanced magnetic flux 50. This shaft voltage is applied through the rotating shaft 16 and the housing 18 to the inner and outer rings 19a, 19c of the rotating bearing 19. Although the inner and outer rings 19a, 19c of the bearing 19 are insulated from each other with a lubricating oil film, this lubricating oil film is as thin as several μm, and thus insulation breakdown occurs when a voltage above a certain threshold (about several volts) is applied. Once the insulation between the outer ring 19a and the inner ring 19c of the bearing 19 has broken down, an induced current 52 flows through a circulation route from the rotating shaft 16 to the bearing 19 to the housing 18 and back to the rotating shaft 16 as shown in FIG. 16. A problem arises here that the joule loss concentrates at the part of insulation breakdown, i.e., the bearing 19, which promotes electrical corrosion of the bearing 19.

To solve such a problem, some proposals have been made to separately provide a conductive member that connects the rotating shaft 16 and the housing 18 to each other. Such a configuration can suppress electrical corrosion of the bearings 19 by causing the induced current 52 to flow dominantly to the conductive member that has lower impedance than the bearings 19. However, employing such a conductive member leads to structural restrictions, which raises other problems such as that the design flexibility decreases and that the electric motor 10 as a whole increases in size, weight, and cost.

This embodiment is provided with the cancel coil 32 to suppress electrical corrosion of the bearings 19 without requiring a conductive member that couples together the rotating shaft 16 and the housing 18. As described already, the cancel coil 32 is wound around the yoke 26, and mainly two types of magnetic fluxes flow through the yoke 26.

One is the unbalanced magnetic flux 50 resulting from a magnetic unbalance in the electric motor 10. The unbalanced magnetic flux 50 flows through the yoke 26 in the circumferential direction. The unbalanced magnetic flux 50 is a tertiary magnetic flux that changes at a frequency three times higher than the fundamental frequency.

The other is a magnetic flux that generates rotating torque. Hereinafter this magnetic flux will be referred to as an effective magnetic flux. The effective magnetic flux flows outward in the radial direction from a tip of one tooth 28, and moves through the yoke 26 in the circumferential direction, and then flows inward in the radial direction through another tooth 28 into the rotor 12. This effective magnetic flux is a primary magnetic flux that changes at the same frequency as the fundamental frequency.

The element coils C composing the cancel coil 32 are wound around the yoke 26 so as to surround the periphery of the unbalanced magnetic flux 50 and the effective magnetic flux flowing through the yoke 26 in the circumferential direction. In other words, the unbalanced magnetic flux 50 and the effective magnetic flux penetrate the inside of the cancel coil 32. As a result, a voltage is induced in the cancel coil 32 according to the temporal change of the unbalanced magnetic flux 50 and the effective magnetic flux, and a current in the direction of blocking these magnetic fluxes flows through the cancel coil 32.

Figure 5:
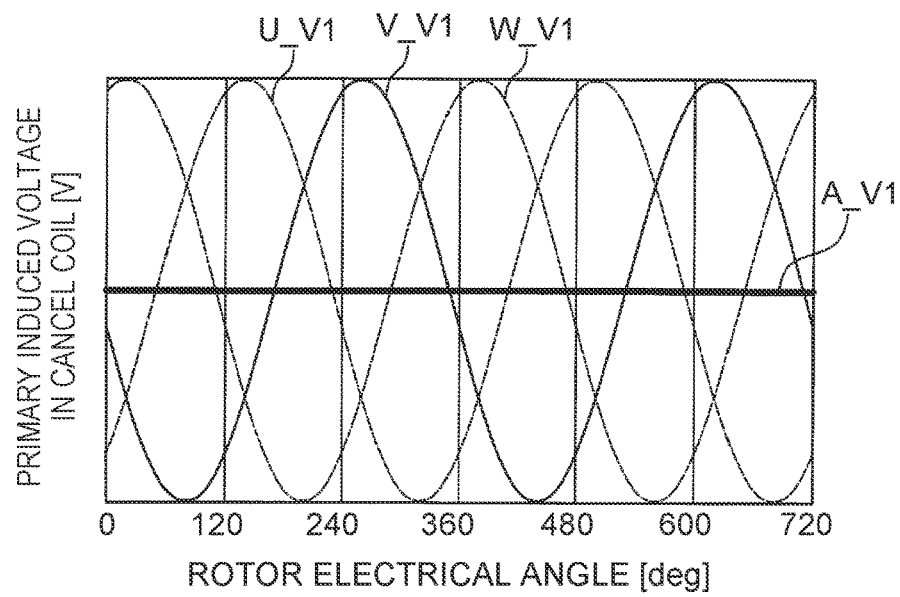
FIG. 5 is a graph showing primary induced voltages.

Hereinafter a voltage induced according to the temporal change of the effective magnetic flux and a voltage induced according to the temporal change of the unbalanced magnetic flux 50 will be referred to as a primary induced voltage and a tertiary induced voltage, respectively. FIG. 5 is a graph showing primary induced voltages. In FIG. 5, the broken line, the solid line, and the dashed and dotted line respectively represent a primary induced voltage U_V1 induced in the first element coil CU, a primary induced voltage V_V1 induced in the second element coil CV, and a primary induced voltage W_V1 induced in the third element coil CW. As is clear from FIG. 5, the primary induced voltages U_V1, V_V1, W_V1 induced in the first to third element coils CU, CV, CW are out of phase from one another by an electrical angle of 120 degrees. Accordingly, when the first to third element coils CU, CV, CW are connected in series, the primary induced voltages U_V1, V_V1, W_V1 induced in the element coils C cancel one another, reducing a voltage A_V1 in the closed circuit as a whole to zero. Specifically, the total value A_V1 of the primary induced voltages becomes the value as represented by the thick solid line in FIG. 5. As the total value A_V1 of the primary induced voltages becomes zero, no primary current flows through the element coils C and no magnetic flux that cancels the effective magnetic flux is generated. As a result, providing the cancel coil 32 does not affect the output torque of the electric motor 10.

Figure 6:
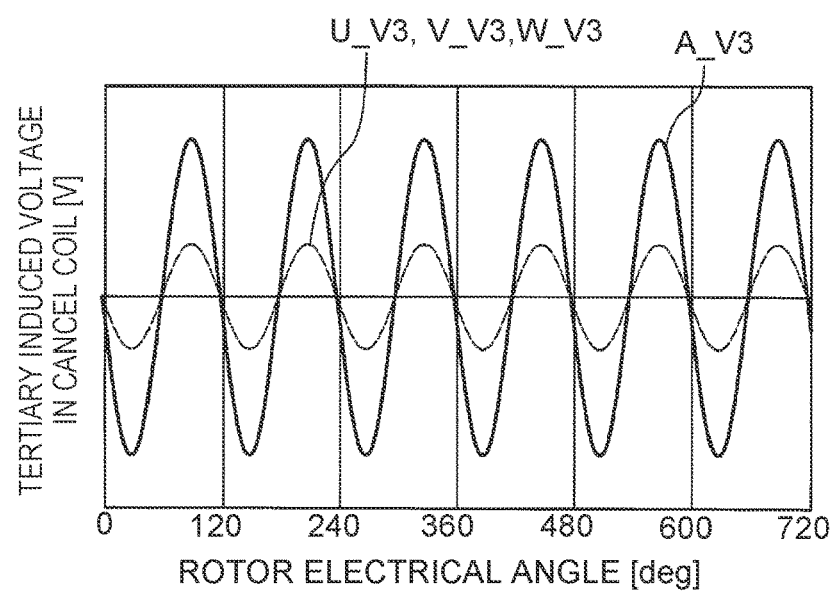
FIG. 6 is a graph showing tertiary induced voltages.

FIG. 6 is a graph showing tertiary induced voltages. In FIG. 6, the broken line and the solid line respectively represent tertiary induced voltages U_V3, V_V3, W_V3 induced in the element coils C and a total value A_V3 of the tertiary induced voltages induced in the first to third element coils CU, CV, CW. The tertiary induced voltages U_V3, V_V3, W_V3 induced in the first to third element coils CU, CV, CW are the same in phase. Accordingly, when the first to third element coils CU, CV, CW are connected in series, the voltage A_V3 in the closed circuit as a whole becomes a voltage three times higher than the tertiary induced voltages U_V3, V_V3, W_V3 induced in the respective element coils C. As a high voltage is induced in the closed circuit as a whole, an induced current flows through the closed circuit. This induced current flows in such a direction that the unbalanced magnetic flux 50 is canceled.

Figure 7:
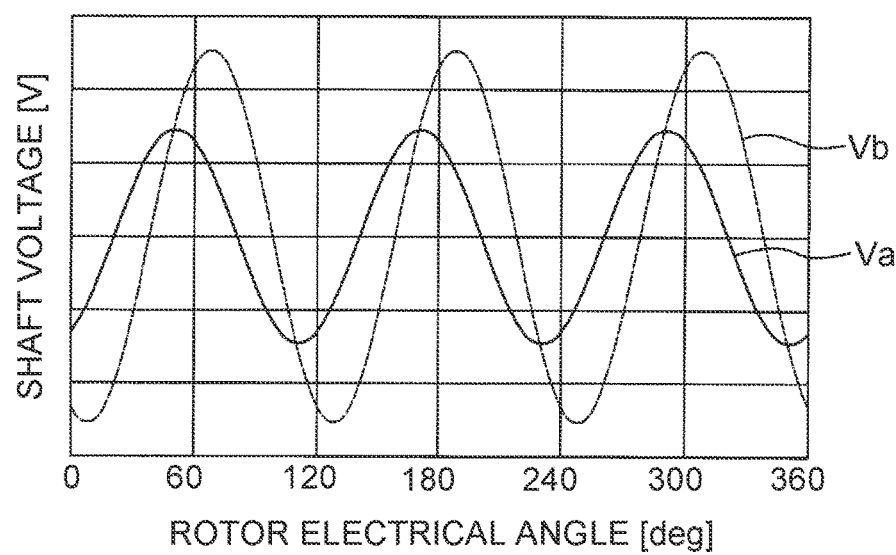
FIG. 7 is a graph showing shaft voltages.

FIG. 7 is a graph showing differences in shaft voltage depending on whether or not the cancel coil 32 is provided. In FIG. 7, the solid line and the broken line respectively represent a shaft voltage Va when the cancel coil 32 is provided and a shaft voltage Vb when the cancel coil 32 is not provided. As is clear from FIG. 7, providing the cancel coil 32 results in a lower shaft voltage as the unbalanced magnetic flux 50 is reduced by the tertiary induced current flowing through the cancel coil 32. With the shaft voltage thus reduced, insulation breakdown of the lubricating oil films on the bearings 19 is prevented and electrical corrosion of the bearings 19 is effectively prevented.

Figure 4:
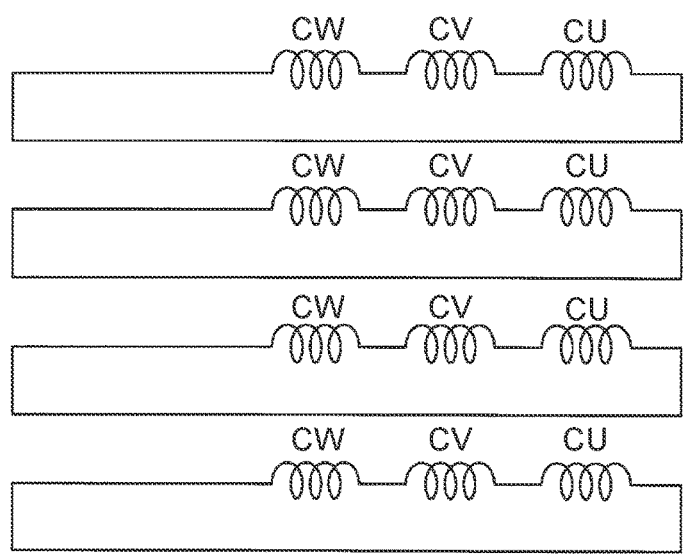
FIG. 4 is a connection diagram of another cancel coil.

The form of connection of the element coils C shown in FIG. 3 is merely an example; the form of connection of the element coils C may be changed as appropriate as long as the cancel coil 32 constitutes one or more closed circuits. Another example may be a configuration as shown in FIG. 4 in which one first element coil CU, one second element coil CV, and one third element coil CW are connected in series to constitute one closed circuit, and the cancel coil 32 as a whole includes four closed circuits. This configuration in which one closed circuit includes one each of the first to third element coils CU, CV, CW allows easy winding compared with the configuration of FIG. 3. On the other hand, if all the element coils CU, CV, CW are connected in series to constitute a single closed circuit as shown in FIG. 3, a magnetic unbalance due to eccentricity of the rotor 12 etc., and ultimately differences in effective magnetic flux according to the circumferential position, can be absorbed. As a result, the total value A_V1 of the primary induced voltages can be reduced to zero more reliably, and the influence of the cancel coil 32 on the rotating torque can be reduced more reliably.

Yet another example may be a configuration in which two first element coils CU, two second element coils CV, and two third element coils CW are connected in series to constitute one closed circuit, and the cancel coil 32 as a whole includes two closed circuits. In any case, it is desirable that one closed circuit include the same numbers of the first element coils CU, the second element coils CV, and the third element coils CW. Such a configuration can reduce the sum A_V1 of the primary induced voltages in one closed circuit close to zero. In this case, it is also desirable that the first to third element coils CU, CV, CW are equal to one another in magnetomotive force, i.e., in material, shape, number of winding, etc. of the winding constituting the element coil C. Such a configuration can reduce the sum A_V1 of the primary induced voltages in one closed circuit to nearly zero. As a result, the influence of the cancel coil 32 on the rotating torque can be reduced more reliably.

This embodiment is provided with the first to third element coils CU, CV, CW in one closed circuit to minimize the influence on the rotating torque. However, if suppression of electrical corrosion of the bearings 19 is the only purpose, the first to third element coils CU, CV, CW do not have to be connected in series. For example, one closed circuit may be composed of the first element coils CU alone, the second element coils CV alone, or the third element coils CW alone. This configuration can also reduce the unbalanced magnetic flux 50, and thus can suppress electrical corrosion of the bearings 19.

Next, variations in arrangement of the element coils C will be described. In FIG. 1, the element coils C are disposed in all the slots. However, the number and the positions of the element coils C are not particularly limited, as long as one or more element coils C are provided that extend in the axial direction at positions on the inner circumferential side and the outer circumferential side relative to the yoke 26 and extend in the radial direction at positions outside the stator core 24 in the axial direction.

Figure 8:
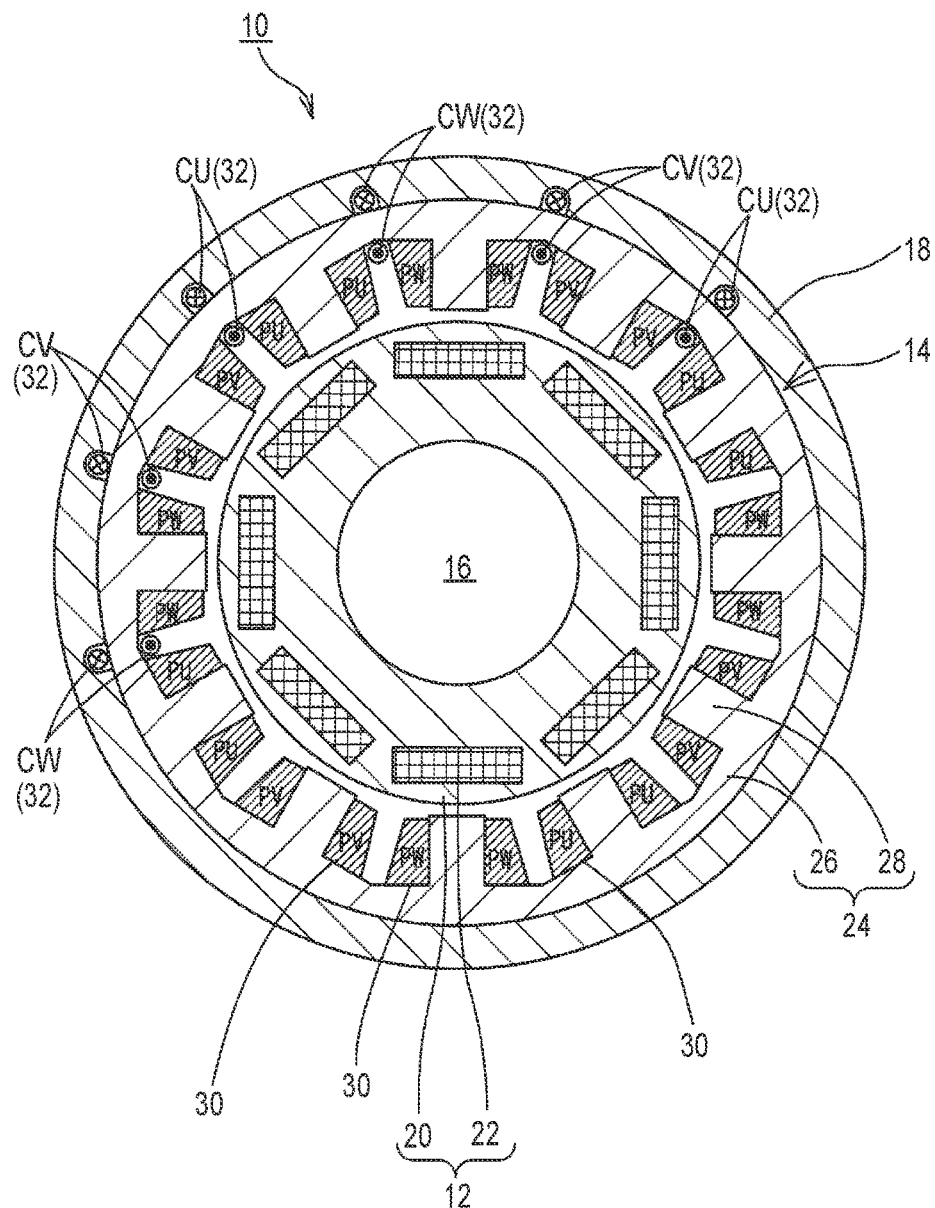
FIG. 8 is a sectional view showing one example of another electric motor.
Figure 9:
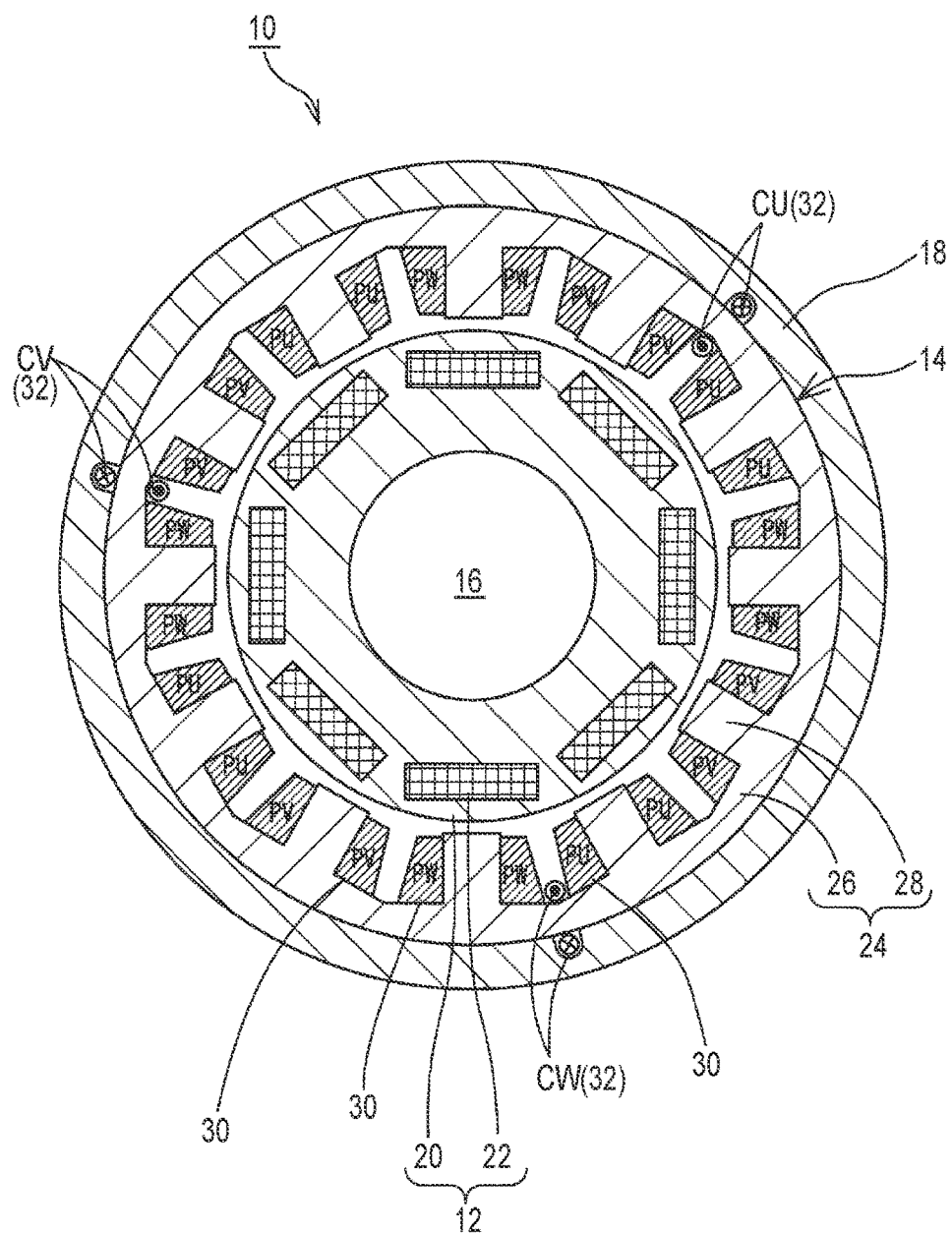
FIG. 9 is a sectional view showing one example of another electric motor.

For example, the element coils C may be disposed only partially in the circumferential direction as shown in FIG. 8 and FIG. 9. In the example of FIG. 8, two first element coils CU, two second element coils CV, and two third element coils CW, total six element coils C, are disposed in six consecutive slots. The six element coils C may be connected in series to constitute a single closed circuit, or may be connected by predetermined numbers to constitute a plurality of closed circuits. In the example of FIG. 9, one first element coil CU, one second element coil CV, and one third element coil CW are disposed at 120-degree intervals in the circumferential direction. This configuration can also reduce the unbalanced magnetic flux, and thus can reduce electrical corrosion of the bearings 19.

Figure 10:
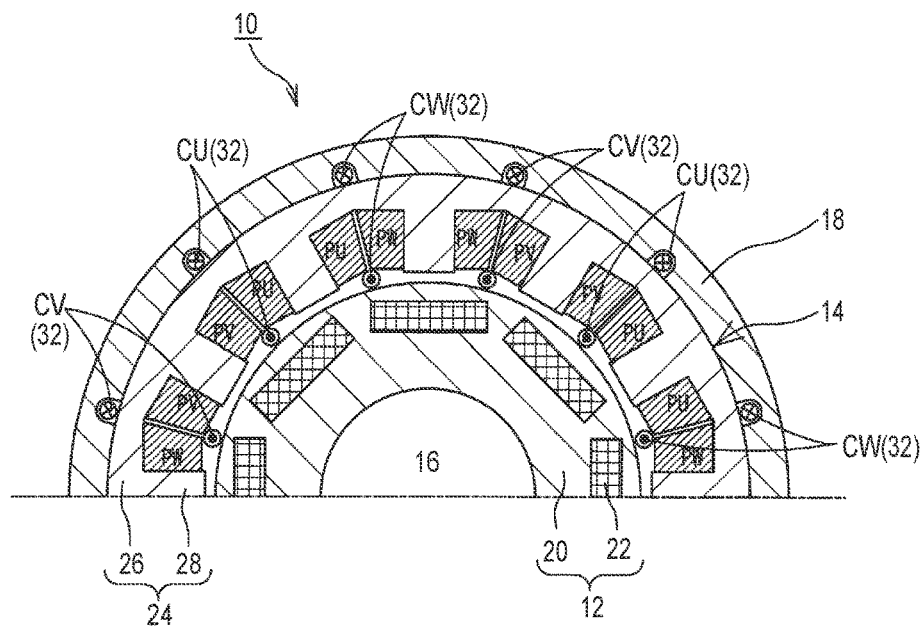
FIG. 10 is a sectional view showing one example of another electric motor.

In the foregoing examples, the element coils C extend through the slots (pass through the slots) in the axial direction and are wound so as to traverse the yoke 26 on the outside of the stator core 24 in the axial direction. However, the positions of the element coils C may be changed as appropriate. For example, as shown in FIG. 10, the element coils C may extend in the axial direction at positions on the inner circumferential side relative to the stator coil 30 (pass through positions on the inner circumferential side relative to the stator coil 30), and may extend in the radial direction so as to traverse the stator coil 30 and the yoke 26 on the outside of the stator core 24 in the axial direction. This configuration allows the element coils C to be disposed even when the slots have no extra space, and can ultimately suppress electrical corrosion of the bearings 19. Nevertheless, if the slots have extra space, disposing the element coils C so as to partially pass through the slots as shown in FIG. 1 can suppress electrical corrosion of the bearings 19 more reliably owing to the excellent magnetic properties. Moreover, the configuration of FIG. 1 in which the element coils C are disposed so as to partially pass through the slots can further reduce the wire length of the cancel coil 32.

Figure 11:
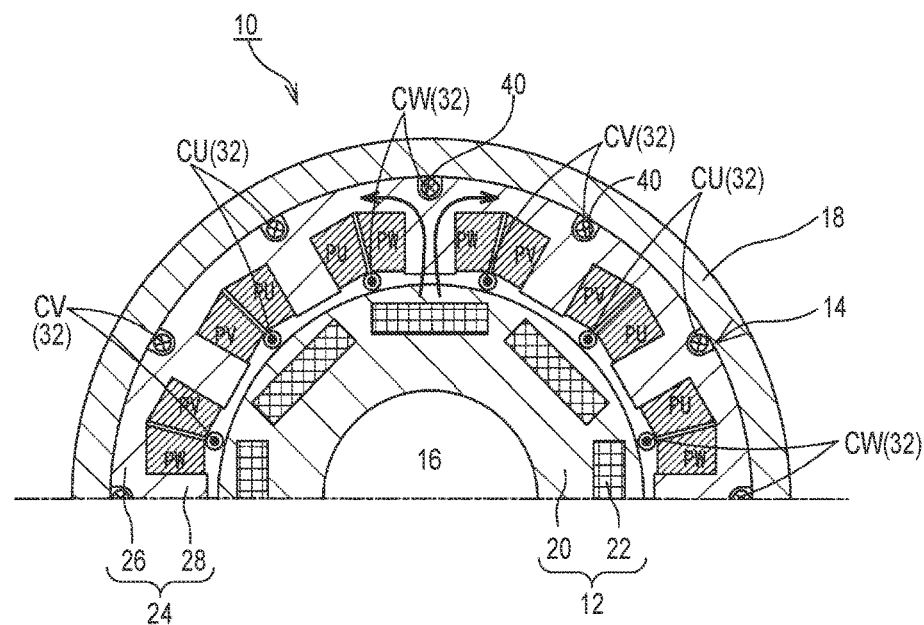
FIG. 11 is a sectional view showing one example of another electric motor.

In the foregoing examples, grooves in which the element coils C are partially housed are provided in an inner circumferential surface of the housing 18 to avoid interference between the element coils C and the housing 18. Alternatively, as shown in FIG. 11, grooves 40 penetrating in the axial direction may be provided in an outer circumferential surface of the stator core 24, instead of in the housing 18, and the element coils C may be housed in the grooves 40. In FIG. 11, the grooves 40 penetrating in the axial direction are provided at locations opposite to the teeth 28 in the outer circumferential surface of the stator core 24. This is because providing the grooves 40 at such locations has less influence on the effective magnetic flux. Specifically, the effective magnetic flux passes through a route as indicated by the thick arrows in FIG. 11 when entering inside the stator core 24. The effective magnetic flux having flowed from the rotor 12 into the tip of one tooth 28 flows outward in the radial direction, and then branches toward both sides in the circumferential direction to flow through the yoke 26 in the circumferential direction. The effective magnetic flux flows in the reverse order when exiting from the stator core 24 to the rotor 12. Thus, the locations opposite to the teeth 28 in the outer circumferential surface of the stator core 24 can be said to be locations where almost no effective magnetic flux passes through. Cutting the stator core 24 at such locations to form the grooves 40 has little influence on the rotating torque. On the other hand, as is clear from FIG. 11, providing such grooves 40 can prevent the element coils C from protruding from the outer circumferential surface of the stator core 24, and thus can prevent interference between the stator 14 and the housing 18 without setting grooves in the housing 18.

Figure 12:
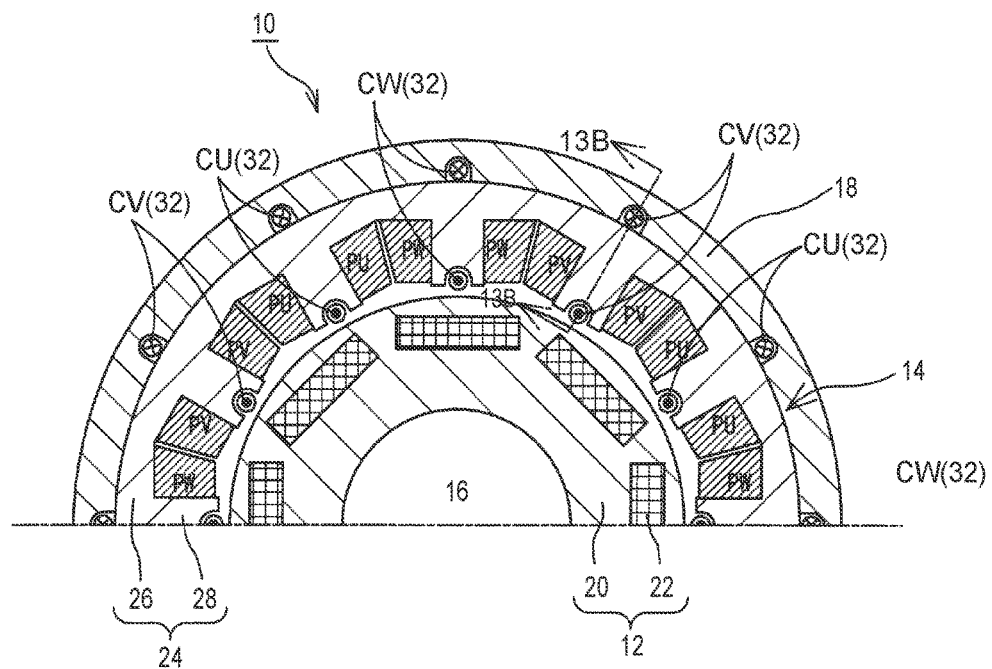
FIG. 12 is a sectional view showing one example of another electric motor.

In this case, the part of the element coil C located on the inner circumferential side relative to the yoke 26 may pass through the slot, or may pass through a position on the inner circumferential side relative to the phase coil P as shown in FIG. 11. Alternatively, this part of the element coil C may pass through a position on the inner circumferential side relative to the teeth 28 as shown in FIG. 12. In the example of FIG. 12, the element coils C extend in the axial direction at positions on the inner circumferential side relative to the teeth 28, and are wound so as to extend in the radial direction and traverse the teeth 28 and the yoke 26 on the outside of the stator core 24 in the axial direction. This configuration allows winding of the cancel coil 32 even when the slots have no extra space. While the tips of the teeth 28 are slightly cut in the configuration shown in FIG. 12, it is more desirable that the tips of the teeth 28 be not cut if there is extra space. This is to prevent a decrease in rotating torque due to the cut core.

Figure 13A:
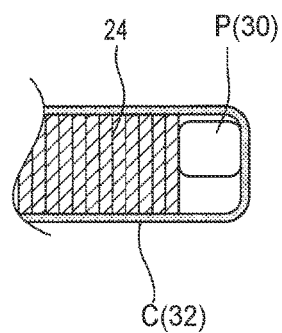
FIG. 13A and FIG. 13B are sectional views taken along the line 13B-13B of FIG. 12.

A coil end that is a part of the stator coil 30, a connecting wire that connects the coils P of the same phase to each other, and the like are present at the ends of the stator 14 in the axial direction. The element coils C may pass through the outside in the axial direction or the inside in the axial direction relative to these coil ends, connecting wire, etc. (hereinafter referred to collectively as the coil end etc.). Specifically, as shown in FIG. 13A, the ends of the element coil C in the axial direction may pass through the outside in the axial direction relative to the coil end etc. This configuration allows the cancel coil 32 to be installed after the stator coil 30 is installed on the stator core 24. In other words, the stator coil 30 can be installed by the same procedure as in the related art before the cancel coil 32 is installed.

Figure 13B:
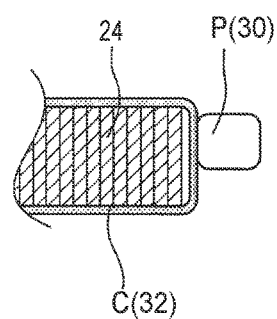

Alternatively, the ends of the element coil C in the axial direction may pass through the gap between the axial end face of the stator core 24 and the coil end etc. as shown in FIG. 13B. This configuration allows the cancel coil 32 to be installed along with an insulator. Specifically, the stator 14 for the electric motor 10 typically has a member called an insulator that is disposed between the stator core 24 and the stator coil 30 to insulate the two from each other. In the form shown in FIG. 13B, the element coil C is partially disposed between the stator core 24 and the stator coil 30 as with the insulator. In this case, therefore, if the element coil C is partially integrated with the insulator in advance, the element coil C can be partially installed at the same time as the insulator is installed, so that the installation man-hours can be reduced.

Figure 14:
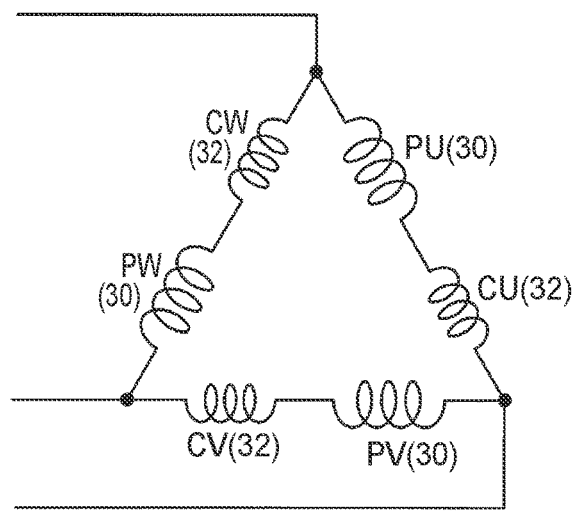
FIG. 14 is a connection diagram of a stator coil and a cancel coil in delta connection.
Figure 15:
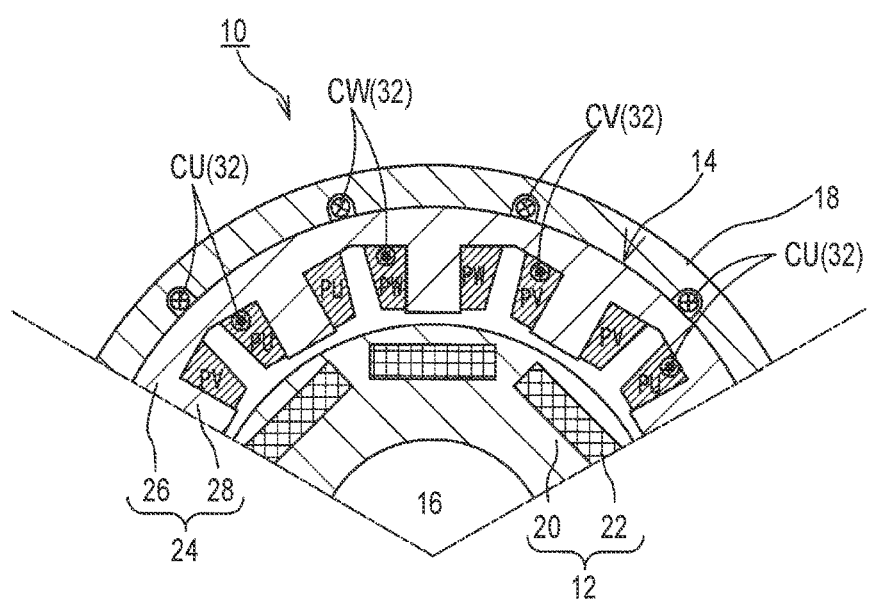
FIG. 15 is a sectional view showing one example of another electric motor.

In the foregoing description, the case of star connection in which one ends of the three-phase phase coils PU, PV, PW are connected to one another at the neutral point is taken as an example. However, the technique of the present application is also applicable to the case of delta connection in which the three-phase phase coils PU, PV, PW are connected to one another in the direction of application of a phase voltage to constitute a closed circuit. FIG. 14 is a connection diagram of the stator coil 30 in delta connection. FIG. 15 is a transverse sectional view of a part of the stator 14 with the stator coil 30 in delta connection. As shown in FIG. 14, in the case of delta connection, the three-phase phase coils PU, PV, PW are connected in series to form a closed circuit. In FIG. 14, each of the element coils C composing the cancel coil 32 is interposed between the phase coils P. In other words, in FIG. 14, all the three-phase phase coils PU, PV, PW and the cancel coil 32 are connected in series to constitute a single closed circuit. In this case, the element coil C is connected at the end or beginning of one phase coil P as shown in FIG. 15. This configuration can reduce the unbalanced magnetic flux 50 and ultimately can reduce electrical corrosion of the bearings 19 even in the case of delta connection. Moreover, this configuration can integrate the phase coil P and the element coil C, and thus can reduce the number of the coils. However, the connection diagram shown in FIG. 14 is merely an example, and the form of connection may be changed as appropriate. Accordingly, in the case of delta connection, too, the cancel coil 32 may be independent of the stator coil 30 without being connected to the stator coil 30.

What is claimed is:

1. A stator for an electric motor, the stator comprising:
  a stator core comprising:
    a yoke having an annular shape, and
    a plurality of teeth protruding from an inner circumferential side of the yoke in a stator radial direction;
  a stator coil wound around the teeth, the stator coil being configured to generate a rotating magnetic field as a current is applied to the stator coil; and
  a cancel coil extending in a stator axial direction at positions on the inner circumferential side and an outer circumferential side relative to the yoke, the cancel coil being wound around the stator core such that the cancel coil extends in the stator radial direction at positions outside the stator core in the stator axial direction and traverses the yoke,
  wherein the stator coil comprises phase coils including a U-phase coil, a V-phase coil, and a W-phase coil,
  wherein the U-phase coil, the V-phase coil, and the W-phase coil are connected to one another,
  wherein the cancel coil has a plurality of first element coils corresponding to the U-phase coil and wound at different locations, a plurality of second element coils corresponding to the V-phase coil and wound at different locations, and a plurality of third element coils corresponding to the W-phase coil and wound at different locations, and
  wherein the cancel coil has a plurality of closed circuits in each of which one first element coil, one second element coil, and one third element coil are connected in series.

2. The stator according to claim 1, wherein
  a magnetomotive force of the first element coil, a magnetomotive force of the second element coil, and a magnetomotive force of the third element coil are equal to one another.

3. The stator according to claim 1, wherein
  grooves penetrating in the stator axial direction are provided at locations facing to the teeth in an outer circumferential surface of the yoke, and
  the cancel coil is partially housed in the grooves.

4. The stator according to claim 1, wherein
  the cancel coil is arranged to pass through a slot that is a gap between the teeth, and
  the cancel coil is arranged to be wound such that the cancel coil traverses the yoke at positions outside the stator core in the stator axial direction.

5. The stator according to claim 1, wherein
  the cancel coil is arranged to pass through positions on the inner circumferential side relative to the stator coil, and
  the cancel coil is arranged to be wound such that the cancel coil traverses the stator coil and the yoke at positions outside the stator core in the stator axial direction.

6. The stator according to claim 1, wherein
  the cancel coil is arranged to pass through positions on the inner circumferential side relative to the teeth, and
  the cancel coil is arranged to be wound such that the cancel coil traverses the teeth and the yoke at positions outside the stator core in the stator axial direction.

7. The stator according to claim 1, wherein
  the stator coil is comprised of a U-phase coil, a V-phase coil, and a W-phase coil in star connection, and
  the cancel coil is not connected to the stator coil.

8. The stator according to claim 1, wherein
  the stator coil is comprised of a U-phase coil, a V-phase coil, and a W-phase coil in delta connection, and
  the cancel coil is connected in series to the stator coil.

9. The stator according to claim 1, wherein a portion of the cancel coil on the inner circumferential side of the yoke extends along the stator axial direction, and is arranged between two of the phase coils along a circumferential direction of the yoke.

10. An electric motor comprising:
a rotor;
a rotating shaft configured to be rotatably mounted on a housing through bearings and rotate with the rotor; and
a stator disposed on an outer periphery of the rotor, the stator comprising:
a stator core comprising:
  a yoke having an annular shape, and
  a plurality of teeth protruding from an inner circumferential side of the yoke in a stator radial direction,
a stator coil wound around the teeth, the stator coil being configured to generate a rotating magnetic field as a current is applied to the stator coil, and
a cancel coil extending in a stator axial direction at positions on the inner circumferential side and an outer circumferential side relative to the yoke, the cancel coil being wound around the stator core such that the cancel coil extends in the stator radial direction at positions outside the stator core in the stator axial direction and traverses the yoke,
wherein the stator coil comprises phase coils including a U-phase coil, a V-phase coil, and a W-phase coil,
wherein the U-phase coil, the V-phase coil, and the W-phase coil are connected to one another,
wherein the cancel coil has a plurality of first element coils each corresponding to the U-phase coil and wound at different locations, a plurality of second element coils corresponding to the V-phase coil and wound at different locations, and a plurality of third element coils corresponding to the W-phase coil and wound at different locations, and
wherein the cancel coil has a plurality of closed circuits in each of which one first element coil, one second element coil, and one third element coil are connected in series.

11. The electric motor according to claim 10, wherein a portion of the cancel coil on the inner circumferential side of the yoke extends along the stator axial direction, and is arranged between two of the phase coils along a circumferential direction of the yoke.

* * * * *